(12) United States Patent
Imamura et al.

(10) Patent No.: US 8,381,043 B2
(45) Date of Patent: Feb. 19, 2013

(54) SYSTEM FOR TESTING A HINGE AND A CABLE CONNECTING THE MAIN BODY AND THE DISPLAY OF A DEVICE

(75) Inventors: Shigeharu Imamura, Ome (JP); Tooru Mamata, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 269 days.

(21) Appl. No.: 12/616,713

(22) Filed: Nov. 11, 2009

(65) Prior Publication Data

US 2010/0223508 A1 Sep. 2, 2010

(30) Foreign Application Priority Data

Feb. 27, 2009 (JP) ................................. 2009-046797

(51) Int. Cl.
*G06F 11/26* (2006.01)

(52) U.S. Cl. .......... 714/47.2; 714/27; 714/44; 714/47.3; 702/108

(58) Field of Classification Search .................... 714/27, 714/44, 47.2, 47.3
See application file for complete search history.

(56) References Cited

U.S. PATENT DOCUMENTS

| | | | | |
|---|---|---|---|---|
| 4,571,456 | A * | 2/1986 | Paulsen et al. | 379/457 |
| 6,970,804 | B2 * | 11/2005 | Siegel et al. | 702/182 |
| 7,110,916 | B2 | 9/2006 | Shimonishi | |
| 7,243,270 | B2 | 7/2007 | Taniguchi et al. | |
| 7,373,382 | B2 | 5/2008 | Nakai et al. | |
| 2002/0162057 | A1 * | 10/2002 | Talagala | 714/54 |
| 2003/0079160 | A1 * | 4/2003 | McGee et al. | 714/39 |
| 2004/0117153 | A1 * | 6/2004 | Siegel et al. | 702/183 |
| 2004/0181712 | A1 * | 9/2004 | Taniguchi et al. | 714/47 |
| 2006/0167656 | A1 * | 7/2006 | Shimonishi | 702/182 |
| 2007/0006220 | A1 * | 1/2007 | Han | 717/174 |
| 2007/0073911 | A1 * | 3/2007 | Eguchi et al. | 710/8 |
| 2007/0291447 | A1 * | 12/2007 | Nakajima et al. | 361/683 |
| 2008/0049640 | A1 * | 2/2008 | Heinz et al. | 370/252 |
| 2009/0041263 | A1 * | 2/2009 | Hoshuyama | 381/94.1 |
| 2009/0295975 | A1 * | 12/2009 | Takahashi et al. | 348/333.01 |
| 2010/0073560 | A1 * | 3/2010 | Kitano et al. | 348/554 |

FOREIGN PATENT DOCUMENTS

| | | |
|---|---|---|
| JP | 07-225701 | 8/1995 |
| JP | 2002-061535 | 2/2002 |
| JP | 2002-236576 | 8/2002 |
| JP | 2003-309629 A | 10/2003 |
| JP | 2004-213618 | 7/2004 |
| WO | WO 2004/047042 A1 | 6/2004 |

OTHER PUBLICATIONS

Explanation of Non-English Language References.
Japanese Office Action for Japanese Application No. 2009-046797, dated Feb. 10, 2010, in 8 pages.
Japanese Office Action dated Apr. 10, 2012 of corresponding Japanese Patent Application No. 2010-138628, in 6 pages.

* cited by examiner

*Primary Examiner* — Chae Ko

(74) *Attorney, Agent, or Firm* — Knobbe, Martens, Olson & Bear LLP

(57) ABSTRACT

According to an aspect of the invention, an information processing apparatus includes a main body having a top face, a display connected to the main body by a hinge and pivotally moves between a first state where the top face is covered with the display and a second state where the top face is exposed, a counter which stores a number of times the state has changed between the first state and the second state, a monitor which detects a malfunction in the hinge when the number of times reaches a given number, and a data transmitter which sends data corresponding with the detected malfunction.

6 Claims, 5 Drawing Sheets

SYSTEM FOR TESTING A HINGE AND A CABLE CONNECTING THE MAIN BODY AND THE DISPLAY OF A DEVICE

CROSS-REFERENCE TO RELATED APPLICATIONS

This application is based upon and claims the benefit of priority from Japanese Patent Application No. 2009-046797, filed Feb. 27, 2009, the entire contents of which are incorporated herein by reference.

BACKGROUND

1. Field

The present invention relates to an information processing apparatus and, more particularly, to a technique for predicting when a failure will occur in an information processing apparatus.

2. Description of the Related Art

In information processing apparatus as typified by notebook personal computers, the components deteriorate as the apparatus continues to be used by the user and a failure may occur because of their deteriorations. Usually, measures are taken to avoid a failure that is fatal to the apparatus; for example, the apparatus is inspected regularly by a maintenance service provider or the user contacts the maintenance service provider at the occurrence of a minor abnormality.

WO/2004/047042 discloses a method and apparatus for remotely monitoring maintenance monitoring information for hinges that are provided in a notebook personal computer, a copier, a printer, or the like. Information such as an abnormal sound, the number of times of opening or closure, temperature, and torque of the hinges are transmitted as maintenance monitoring information to a maintenance management server over a network and the status and use situation of the hinges are monitored on the basis of the monitoring information. This is to prevent the regular maintenance inspection of the hinges from being unduly inefficient and to prevent trouble with or a failure in the hinges.

However, in the above scheme, although maintenance monitoring information is transmitted to the management server, the user cannot recognize immediately whether trouble or a failure has occurred actually with or in the hinges or will occur there in the future. That is, a step is necessary that a maintenance service provider acquires the maintenance monitoring information from the management server and checks it. No consideration is given to an idea that the information processing apparatus itself carries out an inspection test.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes: a main body having a top face; a display connected to the main body by a hinge, the display configured to move pivotally around the hinge between a first state where the top face is covered with the display and a second state where the top face is exposed; a counter configured to store a number of times the state has changed between the first state and the second state; a monitor configured to detect a malfunction in the hinge when the number of times reaches a predetermined number; and a data transmitter configured to send data corresponding with the detected malfunction.

Figure 1:
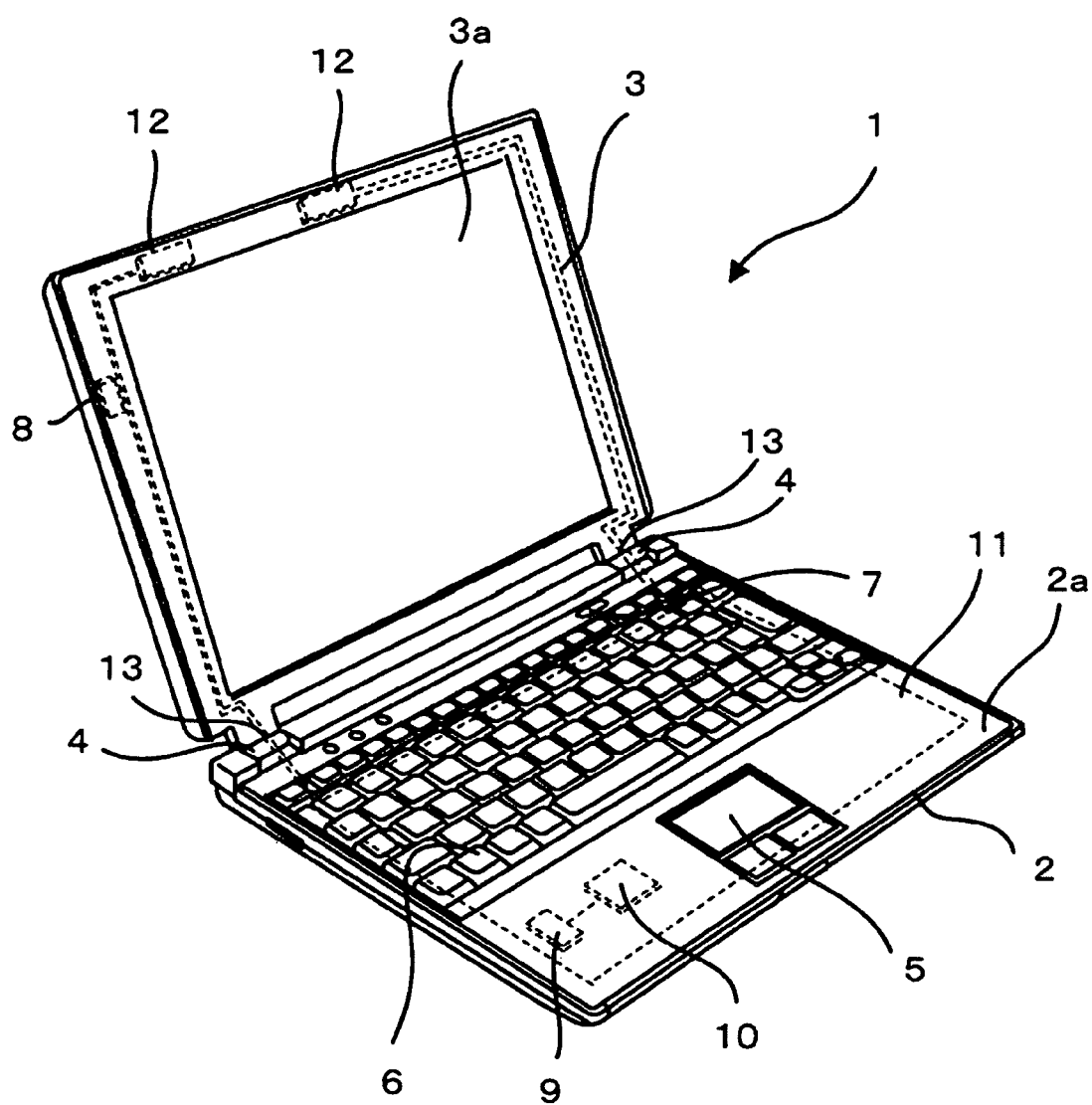
FIG. 1 is a perspective view showing an appearance of a computer according to an embodiment of the invention.

An embodiment of the present invention will be hereinafter described with reference to the drawings. This embodiment will be directed to a notebook computer which is an example information processing apparatus. FIG. 1 is a perspective view showing an appearance of a computer according to the embodiment of the invention.

The computer 1 has a main body 2 and a display unit 3 is attached to the main body 2 via hinges 4 in such a manner that it can be opened and closed. The display unit 3 can be rotated between an open position where it renders a top surface 2a of the main body 2 exposed and a closed position where it covers the top surface 2a of the main body 2. A display device 3a which is an LCD (liquid crystal display) is incorporated in the display unit 3.

A circuit 11 mounted with plural electronic components is housed in the main body 2. A touch pad 5 and a keyboard 6 through which the user performs an input manipulation are provided in the top surface 2a of the main body 2. A power switch 7 for powering on/off the computer 1 is also provided in the top surface 2a of the main body 2.

The computer 1 according to the embodiment is provided with a structure for detecting opening/closure of the computer 1 to thereby enable counting of the number of times of opening or closure of the computer 1. A magnet 8 is provided in the display unit 3 and a Hall IC 9 is provided in the main body 2. When the magnet 8 in the display unit 3 approaches the Hall IC 9 in the main body 2, a closed state of the computer 1 is recognized. Conversely, when the magnet 8 in the display unit 3 goes away from the Hall IC 9 in the main body 2, an open state of the computer 1 is recognized. Opening/closure of the computer 1 is thus detected. Opening/closure of the computer 1 may be detected without using the Hall IC 9; for example, a mechanism for associating opening/closure of the computer 1 with on/off of a mechanical switch may be employed.

The number of times of opening or closure of the computer 1 detected by the magnet 8 and the Hall IC 9 is counted by a counter circuit 10. Either of the number of times of opening of the computer 1 and that of closure may be counted.

Child boards 12 are disposed in the display unit 3 at top positions that are distant from the hinges 4. A camera, an antenna, etc. (not shown) are mounted on the child boards 12. The child boards 12 are connected via cables 13 to the circuit board 11 which is provided in the main body 2. The cables 13 go through the respective hinges 4.

As the computer 1 is opened and closed repeatedly, failures may occur such as a failure in the hinges 4 themselves and a disconnection of the cables 13. It is desired that the user or a support center recognize imminence of trouble before it happens. A method for predicting when the apparatus will fail and a method for notifying the user of a prediction result will be described later in detail.

Figure 2:
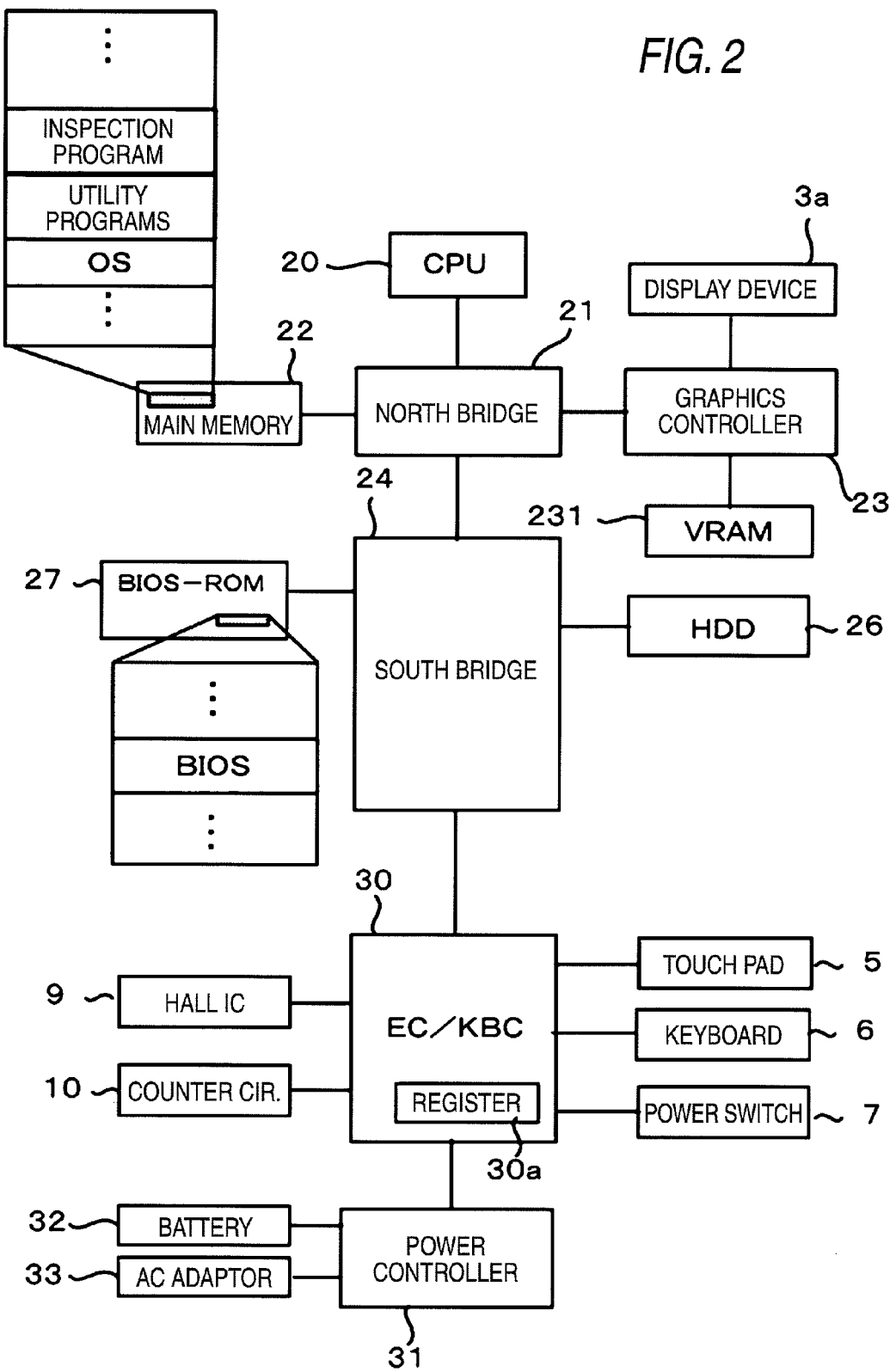
FIG. 2 is a block diagram showing the configuration of the computer according to the embodiment.

FIG. 2 is a block diagram showing the configuration of the computer 1 according to the embodiment of the invention. The computer 1 is equipped with a CPU 20, a north bridge 21, a main memory (RAM) 22, a graphics controller 23, a south bridge 24, a hard disk drive (HDD) 26, a BIOS-ROM 27, an embedded controller/keyboard controller IC (EC/KBC) 30, the display device 3a, the touch pad 5, the keyboard 6, the power switch 7, etc.

The CPU 20 is a processor for controlling the operations of the individual components of the computer 1. The CPU 20 runs the operating system (OS) and various application programs/utility programs when they are loaded into the main memory (RAM) 22 from the HDD 26. The main memory (RAM) 22 is also used as various data buffers.

The CPU 20 also runs a BIOS (basic input/output system) which is stored in the BIOS-ROM 27. The BIOS is a program for hardware control. The BIOS includes BIOS drivers. To give plural functions for hardware control to the OS and an application program, each BIOS driver includes plural function executing routines corresponding to the respective functions.

The BIOS 27 also performs processing for reading the OS from such a storage device as the HDD 26 and developing it in the main memory (RAM) 22 to thereby render the computer 1 in such a state that the user can manipulate it.

The north bridge 21 is a bridge device for connecting a local bus of the CPU 20 to the south bridge 24. The north bridge also has a function of performing a communication with the graphics controller 23 via a PCI Express bus or the like.

The north bridge 21 incorporates a memory controller for controlling the main memory (RAM) 22.

The graphics controller 23 is a display controller for controlling the display device 3a which is used as a display monitor of the computer 1. The graphics controller 23 sends, to the display device 3a, a video signal corresponding display data that has been written to a video memory (VRAM) 231 by the OS or an application program.

The south bridge 24, which is connected to a PCI (peripheral component interconnect) bus and an LPC (low pin count) bus, controls PCI devices, LPC devices, etc. The HDD 26 stores the OS, various application programs/utility programs, and data files.

The EC/KBC 30 is a one-chip microcomputer in which an embedded controller for power management and a keyboard controller for controlling the touch pad 5, the keyboard 6, etc. are integrated together. The EC/KBC 30 performs processing of powering on/off the computer in cooperation with the power controller 31 in response to a manipulation on the power switch 7 by the user. The power controller 31 supplies power to the individual components of the computer 1 using power that is supplied from a battery 32 incorporated in the computer 1 or power that is supplied externally via an AC adaptor 33.

The number of times of opening or closure of the computer 1 is counted by the counter circuit 10. Either of the number of times of opening of the display device 3 and that of closure may be counted. The number of times counted by the counter circuit 10 is held by a register 30a provided in the EC/KBC 30. Alternatively, the counter circuit 10 may be provided in the EC/KBC 30.

The register 30a may be provided in the counter circuit 10. Since the EC/KBC 30 is supplied with power even while the OS is not activated, the number of times of opening or closure of the computer 1 can be counted even if the OS is not activated.

Figure 3:
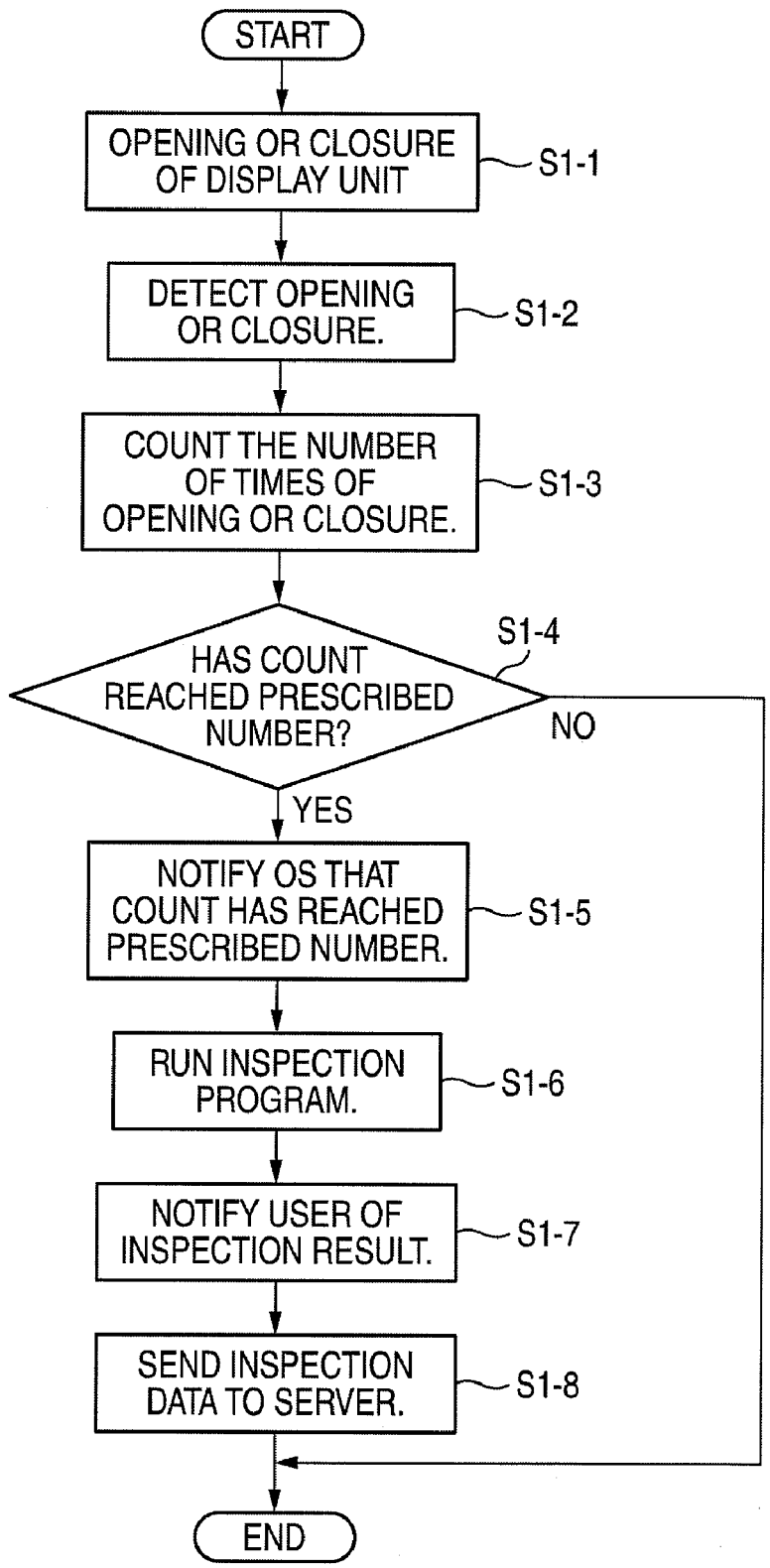
FIG. 3 is a flowchart showing the procedure of a failure inspection process according to the embodiment.

FIG. 3 is a flowchart showing the procedure of a failure inspection process according to the embodiment of the invention.

When the computer 1 is opened or closed at step S1-1, at step S1-2 the opening or closure of the computer 1 is detected by the magnet 8 and the Hall IC 9. At step S1-3, the number of times of opening or closure is counted by the counter circuit 10. If the resulting number of times of opening or closure of the computer 1 (i.e., the count) has reached a prescribed number which is 1,000, for example (S1-4: yes), at step S1-5 the EC/KBC notifies the OS that the count has reached the prescribed number. In response, at step S1-6 the CPU 20 runs an inspection program that is developed in the main memory 22 and thereby inspects the hinges 4 (which connects the display unit 3 to the main body 2) for an abnormality.

More specifically, for example, the CPU 20 inspects the hinges 4 for an abnormality by sending a turn-on signal to the display device 3a of, the display unit 3 and checking the current consumption. If the current consumption does not increase even if the backlight of the display device 3a is turned on, it can be judged that a related cable 13 may be disconnected.

The cables 13, which serve as communications lines of the camera and the antenna which are mounted on the child boards 12 provided in the display unit 3, go through the hinges 4. As its one function, the inspection program conducts a test to check whether the camera can shoot and the antenna can serve for a wireless communication. In the event of the camera being incapable of shooting, the antenna being incapable of serving for a wireless communication, or the like, one of both of the cables 13 going through the hinges 4 which are provided between the display unit 3 and the main body 2 may be disconnected. This inspection program is run as a background operation while the OS is operating.

When the inspection program has been run, at step S1-7 the user is notified of an inspection result. For example, this is done by displaying the inspection result in a pop-up window on the screen of the display device 3a. If no intended image is displayed on the display device 3a because of a disconnection of a related cable 13, a voice message to the effect that a disconnection of the cable 13 has been found by the inspection may be communicated to the user.

At step S1-8, inspection data is sent to a server over a network. The term "inspection data" as used herein means data that is obtained by running the inspection program and contains such information as a current consumption value obtained when a turn-on signal was sent to the display device 3a, whether the camera operated normally, a wireless signal output value of a wireless communication using the antenna, and a variation of the current consumption.

Strain occurs repeatedly in the circuit boards as the displayed unit 3 is opened and closed repeatedly and the hinges 4 work accordingly. Therefore, after the number of times of opening or closure has reached the prescribed number, hardware components mounted on the circuit boards may also be inspected. For example, a program for causing the CPU 20 to perform a particular calculation repeatedly and a program for checking whether reading from and writing to the main memory 22 can be performed correctly may be run to inspect those hardware components for an abnormality.

Step S1-7 (notification of an inspection result) and step S1-8 (sending of inspection data) may be interchanged where appropriate. If the number of times of opening or closure of the computer 1 has not reached the prescribed number yet (S1-4: no), no particular steps are executed.

The number of times of opening or closure of the computer 1 may be stored in the following manner. A count obtained by the EC/KBC 30 and held by the register 30*a* is read by a utility program of the OS. As for the reading timing, a count may be read regularly or when a particular operation such as turning-on of the power has been performed. When the utility program has read a count of the register 30*a*, the read-out count is added to the count (the number of times of opening or closure) stored in the HDD 26 or the like. The count of the register 30*a* is cleared.

The utility program checks the accumulated count regularly and judges whether the number of times of opening or closure of the computer 1 has reached the prescribed number.

In the embodiment according to the invention, when the number of times of opening or closure of the computer 1 has reached the prescribed number, the inspection program is run on the client computer 1. In this manner, the computer 1 can be inspected for an abnormality and the user can be notified of an inspection result immediately.

Before the user (customer) contacts a support center, a maintenance service provider can recognize a cause of the failure in advance by acquiring inspection data over the network.

Therefore, the maintenance service provider who has acquired the inspection data can quickly offer an estimated cost to the user and arrange a repair procedure.

Figure 4:
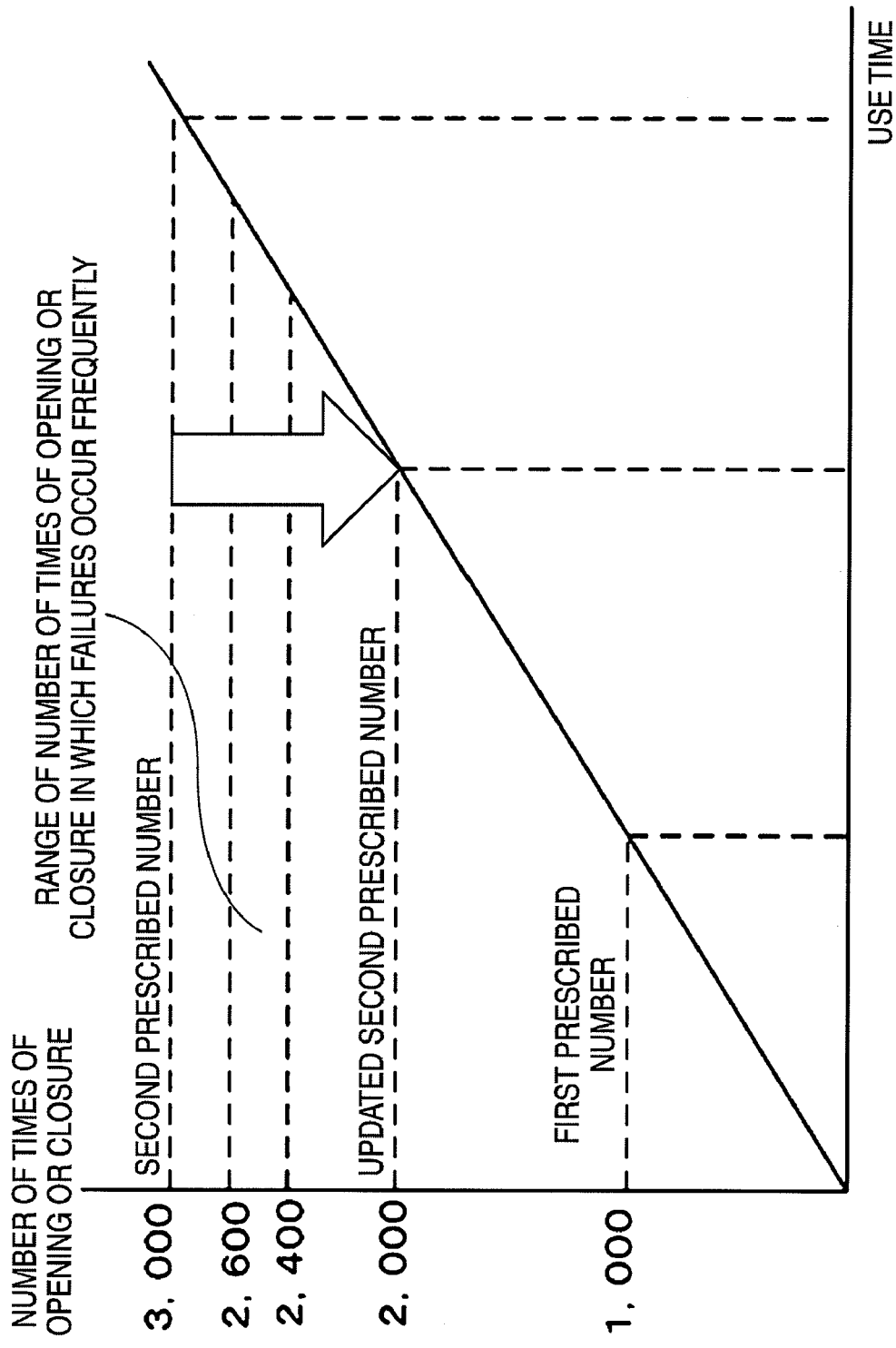
FIG. 4 is a graph schematically showing a relationship between the use time of the computer according to the embodiment and the number of times of opening or closure of a display unit.
Figure 5:
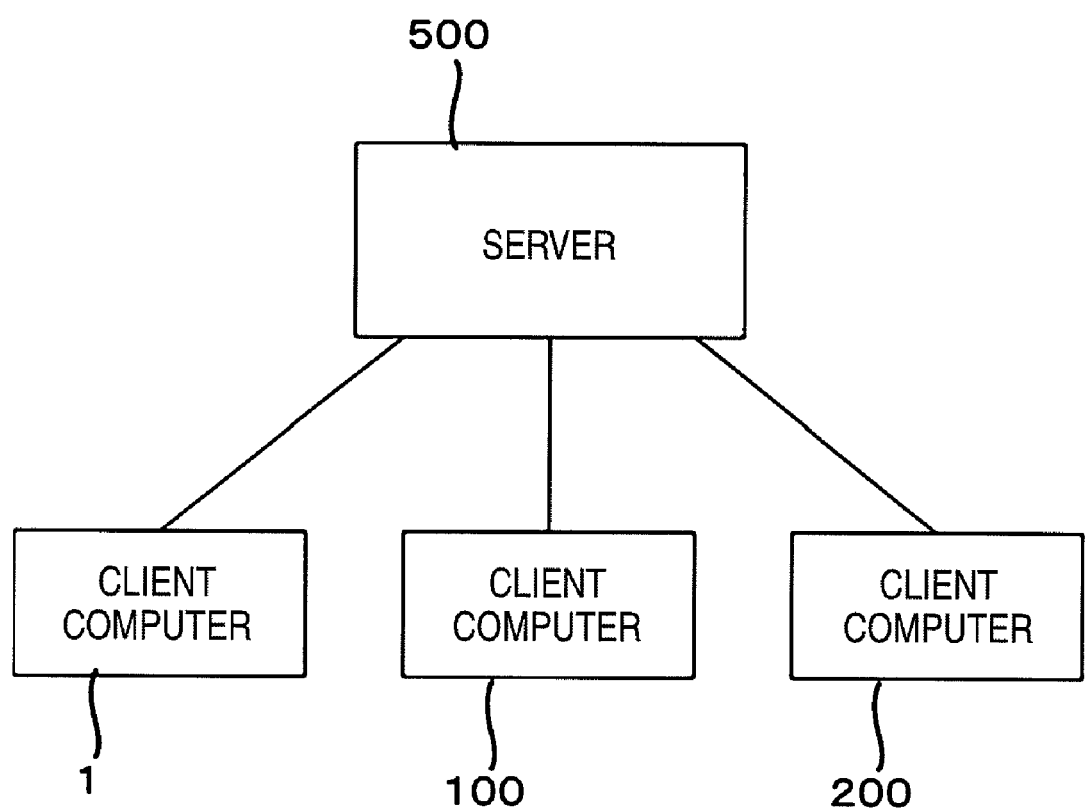
FIG. 5 is a block diagram schematically showing connections between the computer according to the embodiment and a server.

FIG. 4 is a graph schematically showing a relationship between the use time of the computer 1 according to the embodiment of the invention and the number of times of opening or closure of the computer 1. FIG. 5 is a block diagram schematically showing connections between the computer 1 according to the embodiment of the invention and a server.

The inspection program is run when the number of times of opening or closure of the computer 1 has reached a first prescribed number (e.g., 1,000). It is assumed that a second prescribed number for second running of the inspection program is set at 3,000, for example.

Inspection data obtained by running the inspection program are also transmitted to a server 500 from computers 100 and 200 other than the computer 1. Assume that the fact that, for example, an abnormality occurred in a hinge or a disconnection occurred in a cable that goes through a hinge in each of the computers 100 and 200 when the number of times of opening or closure of the display unit was 2,400 to 2,600 has been found from the inspection data that have been transmitted to the server 500. In this case, it is highly likely that running the inspection program second time when the number of times of opening or closure of the display unit has reached 3,000 which is the second prescribed number is too late. Running the inspection program second time earlier, for example, when the number of times of opening or closure of the display unit has reached 2,000, is meaningful in terms of prevention of a failure in the apparatus and finding of a failure in the apparatus in advance.

The prescribed number (threshold value) of times of opening or closure based on which to judge whether to run the inspection program can be updated dynamically on the basis of data acquired from other computers and accumulated in the server.

As described above, the invention can provide an information processing apparatus capable of inspecting itself for an abnormality and notifying the user of an inspection result immediately.

The invention is not limited to the above embodiment and various modifications are possible without departing from the spirit and scope of the invention.

As described with reference to the above embodiment, there is provided an information processing apparatus capable of inspecting itself for an abnormality and notifying the user of an inspection result immediately.

What is claimed is:

1. An information processing apparatus configured to communicate with a server, the information processing apparatus comprising:
    a data receiver configured to receive malfunction data from the server, the malfunction data comprising a first number at which a malfunction occurs in another information processing apparatus;
    an updating module configured to update a threshold number based on the first number if the first number is less than the threshold number;
    a processor configured to execute an operating system;
    a counter configured to count and to store a number of times a state of the information processing apparatus has changed independent of a state of the operating system, wherein the counter is a separate circuit from the processor;
    a monitor configured to perform a malfunction detection test on a component of the information processing apparatus when the number of times reaches the threshold number by causing the operating system to trigger execution of the malfunction detection test by the processor; and
    a data transmitter configured to send a result of the malfunction detection test to the server.

2. The information processing apparatus of claim 1 further comprising:
    a main body comprising a top face; and
    a display connected to the main body by a hinge, the display configured to move pivotally around the hinge between a first state where the top face is covered with the display and a second state where the top face is exposed,
    wherein the first number is a number at which a malfunction of a hinge occurs in the another information processing apparatus,
    wherein the counter is configured to store a number of times the state has changed between the first state and the second state, and
    wherein the monitor is configured to perform the malfunction detection test for the hinge of the information processing apparatus when the number of times reaches the threshold number.

3. The information processing apparatus of claim 2 further comprising a cable configured to connect to a circuit board in the main body and a display panel in the display through the hinge,
    wherein, in the malfunction detection test, whether there is a disconnection of the cable in the hinge is tested.

4. The information processing apparatus of claim 3, wherein the data transmitter is configured to send data indicating that there is the disconnection when the disconnection is detected.

5. A method for inspecting an information processing apparatus configured to communicate with a server, the method comprising:

receiving malfunction data from the server, the malfunction data comprising a first number at which a malfunction occurs in another information processing apparatus;

updating a threshold number based on the first number if the first number is less than the threshold number;

counting a number of times a state of the information processing apparatus has changed independent of a state of an operating system executed by a processor;

storing the number of times the state of the information processing apparatus has changed;

performing a malfunction detection test on a component of the information processing apparatus when the number of times reaches the threshold number by causing the operating system to trigger execution of the malfunction detection test by the processor; and sending a result of the malfunction detection test to the server.

6. A system comprising:

a server; and a plurality of information processing apparatuses, each information processing apparatus configured to communicate with the server, wherein each information processing apparatus comprises:

a processor configured to execute an operating system;

a counter configured to count and to store a number of times a state of the information processing apparatus has changed independent of a state of the operating system, wherein the counter is a separate circuit from the processor;

a monitor configured to perform a malfunction detection test on a component of the information processing apparatus when the number of times reaches a threshold number by causing the operating system to trigger execution of the malfunction detection test by the processor; and a data transmitter configured to send a result of the malfunction detection test to the server, wherein, if a malfunction occurs in one information processing apparatus, the data transmitter of the one information processing apparatus is configured to send malfunction data to the server, the malfunction data comprising a first number at which the malfunction occurs, and wherein, upon receipt of the malfunction data, the server is configured to cause the plurality of information processing apparatuses to update the threshold number based on the first number if the first number is less than the threshold number.

* * * * *